(12) United States Patent
Squires et al.

(10) Patent No.: US 7,254,483 B2
(45) Date of Patent: Aug. 7, 2007

(54) SYSTEM FOR FISHING

(75) Inventors: Vance Randolph Squires, Secret Harbour (AU); Laurie Petrie, Byford (AU); Graham G. Grosvenor, Perth (AU)

(73) Assignee: Advanced Marine Technologies Pty Ltd., Fremantle (AU)

( * ) Notice: Subject to any disclaimer, the term of this patent is extended or adjusted under 35 U.S.C. 154(b) by 1233 days.

(21) Appl. No.: 10/149,343

(22) PCT Filed: Dec. 8, 2000

(86) PCT No.: PCT/AU00/01569

§ 371 (c)(1),
(2), (4) Date: Oct. 15, 2002

(87) PCT Pub. No.: WO01/42992

PCT Pub. Date: Jun. 14, 2001

(65) Prior Publication Data

US 2003/0056419 A1    Mar. 27, 2003

(30) Foreign Application Priority Data

Dec. 8, 1999   (AU)   .................................... PQ4532

(51) Int. Cl.
*G06F 17/40* (2006.01)
(52) U.S. Cl. .............................. 702/2; 702/5
(58) Field of Classification Search .................... 702/1, 702/2, 5; 43/4, 4.5
See application file for complete search history.

(56) References Cited

U.S. PATENT DOCUMENTS 4,445,178 A   4/1984  Scheer et al.

6,252,544 B1 *  6/2001  Hoffberg ................. 342/357.1
6,584,447 B1 *  6/2003  Fox et al. ..................... 705/10

FOREIGN PATENT DOCUMENTS

FR    2 610 415 A    8/1988
WO   WO 00/52611    9/2000

OTHER PUBLICATIONS

Deschamps, FR 2610-415-A, Aug. 5, 1988 (English language Abstract).
PCT International Search Report, International Application No. PCT/AU00/01569, dated Feb. 28, 2001, showing category of relevance for FR 2610-415A.

* cited by examiner

*Primary Examiner*—Donald E McElheny, Jr.
(74) *Attorney, Agent, or Firm*—Marger Johnson & McCollum, PC

(57) ABSTRACT

A data acquisition and retrieval system (11) for fishing. Input means (37) are provided for inputting: (i) geographical positioning data indicating the geographical position of a point for fishing in substantially real-time relative to a region: (ii) weather data indicating the prevailing weather conditions applying to the geographical position of the point in the region; (iii) fish data characterising the fish located at or obtained at the point; (iv) time data specifying the date, time or season corresponding to the real-time at the point; and (v) water condition data of the prevailing environment at the point. A database (60) is provided for storing the data input by the input means (35) relative to the geographical position of the point and linking the data to any previous data stored for the particular geographical position of the point. A graphical user interface accesses the linked data of the database and outputs it in an appropriate medium, usually a display that presents an image pane (141), for interpreting by a user of the system. The system is particularly suited to lobster or prawn fishing in the ocean and can be used to predict where to fish. A method for fishing based on the system is also described.

56 Claims, 12 Drawing Sheets

FISH: CARPENTARIA GULF TIGERS    IDEAL FISH CONDITIONS    GENERIC TYPE:

| CONDITION | | MIN | MAX | BEST | UNITS | PRIORITY | OBSERVATION |
|---|---|---|---|---|---|---|---|
| TEMPERATURE | | 26 | 38 | 32 | °C | 1 | |
| pH | | 8.0 | 8.4 | 8.3 | | 2 | |
| SALINITY | | 45 | 58 | 53 | | 2 | |
| DISSOLVED OXYGEN | | 40 | 100 | 70-80 | | 3 | |
| ORP | | 60 | 200 | 120 | | 4 | |
| TURBIDITY | | 5 | 80 | 10-20 | | 3 | |
| DEPTH | | 5 | 60 | 15-60 | | 1 | |
| ATMOSPHERIC PRESS | | 1004 | 1015 | 1006 | | | |
| DEPTH (CORRECTED) | | | | | | | |
| SWELL | Rising | | | Second | | | |
| | Stable | | | Third | | | |
| | Falling | | | First | | | |
| MOON | | | | | | | |
| TIDE | | | | | | | No fishing at Full Moon |

NOTES:

Fig. 8a

IDEAL FISH CONDITIONS

FISH: BANANA PRAWNS  GENERIC TYPE:

| CONDITION | MIN | MAX | BEST | UNITS | PRIORITY | OBSERVATION |
|---|---|---|---|---|---|---|
| TEMPERATURE | 17 | 35 | 30 | °C | 3 | |
| pH | 7.6 | 8.4 | 8.2 | | 4 | |
| SALINITY | 20 | 56 | 48-50 | | 2 | |
| DISSOLVED OXYGEN | 40 | 100 | 80 | | 4 | |
| ORP | 0 | 250 | 200 | | 5 | |
| TURBIDITY | 40 | 600 | 150 | | 1 | |
| DEPTH | 2 | 70 | 5-20 | | 2 | |
| ATMOSPHERIC PRESS | | | | | | |
| DEPTH (CORRECTED) | | | | | | The Higher the better |
| SWELL | Calm | | Calm | | | Caught mostly away from the bottom and also some on the bottom. Nice flat conditions. |
| MOON | | | | | | Unimporinat all types of moons |
| TIDE | | | | | | Best at chage of tides (High to low, and low to high) |

Fig. 8b

IDEAL FISH CONDITIONS

FISH: WA ROCK LOBSTER  GENERIC TYPE:

| CONDITION | | MIN | MAX | BEST | UNITS | PRIORITY | OBSERVATION |
|---|---|---|---|---|---|---|---|
| TEMPERATURE | | 16 | 25 | 23 | °C | 2 | |
| pH | | 8 | 8.6 | 8.35 | | 1 | |
| SALINITY | | 51 | 58 | 53-56 | | 2 | |
| DISSOLVED OXYGEN | | 60 | 100 | 100 | | 3 | |
| ORP | | 60 | 250 | 160 | | 5 | |
| TURBIDITY | | 0 | 60 | 0-10 | | 4 | |
| DEPTH | | 3 | 200 | 70 | | 5 | |
| ATMOSPHERIC PRESS | | 1000 | 1020 | 1000 | mBar | | In practise a 1004 is the lowest that can be practically worked. At the fish's "shell change" times of the season, much higher atmospheric pressures can actually improve fishing conditions. |
| SWELL | Rising | 2 | | | | | |
| | Stable | 3 | | | | | |
| | Falling | 1 | | | | | |
| MOON | | | | Dark | | | Unimportant at depths greater 150 metres. |
| TIDE | | | | | | | Vance to answer Friday |

Fig. 8c.

FISH: BLUE SWIMMERS

IDEAL FISH CONDITIONS

GENERIC TYPE:

| CONDITION | | MIN | MAX | BEST | UNITS | PRIORITY | OBSERVATION |
|---|---|---|---|---|---|---|---|
| TEMPERATURE | | 14 | 26 | 22 | °C | 2 | |
| pH | | 8.1 | 8.5 | 8.3 | | 1 | |
| SALINITY | | 48 | 58 | 54 | | 2 | |
| DISSOLVED OXYGEN | | 75 | 100 | 100 | | 3 | |
| ORP | | 70 | 240 | 120 | | 5 | |
| TURBIDITY | | 0 | 60 | 0-30 | | 4 | |
| DEPTH | | 1 | 40 | 3-30 | | 4 | |
| ATMOSPHERIC PRESS | | 1004 | 1020 | 1004 | | | Low pressure best. |
| SWELL | Rising | | | 3 | | | |
| | Stable | | | 2 | | | |
| | Falling | | | 1 | | | |
| MOON | | | | | | | Dark |
| TIDE | | | | | | | Best at changes of tide |

NOTES:

IDEAL FISH CONDITIONS

FISH: CARNARVAN & EXMOUTH TIGERS  GENERIC TYPE:

| CONDITION | | MIN | MAX | BEST | UNITS | PRIORITY | OBSERVATION |
|---|---|---|---|---|---|---|---|
| TEMPERATURE | | 17 | 30 | 26 | °C | | |
| pH | | 8.1 | 8.5 | 8.3 | | | |
| SALINITY | | 54 | 58 | 55 | | | |
| DISSOLVED OXYGEN | | 60 | 100 | 90-100 | | | |
| ORP | | 70 | 220 | 120 | | | |
| TURBIDITY | | 5 | 80 | 10-30 | | | |
| DEPTH | | 5 | 80 | 30-60 | | | |
| ATMOSPHERIC PRESS | | 1004 | 1020 | | | | |
| SWELL | Rising | | | Second | | | |
| | Stable | | | Third | | | |
| | Falling | | | First | | | |
| MOON | | | | | | | Dark preferably |
| TIDE | | | | | | | |

NOTES:

Fig. 8e.

SYSTEM FOR FISHING

FIELD OF THE INVENTION

The present invention relates to a system for fishing and more particularly to a data acquisition and retrieval system for fishing, and a graphical user interface for use with such system.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, the term "habitat" throughout the specification will be understood to mean the physical geography of a region that may be inhabited by fish, such as the rocks, sand, seabed etc.

In addition the term "environment" throughout the specification will be understood to mean the actual water conditions of a region that may be inhabited by fish.

BACKGROUND ART

Commercial fishing is an activity that is still dependent to a very large extent on the skill and intuition of the individual fisherman.

Very successful fishermen will always try to 'think' like a fish and try to imagine where the fish would prefer to be. It is generally acknowledged that good predictions can often be made as to where to commence fishing from observing the habitats of the different species of fish, and noting historically where fish have been caught in the past and in what numbers.

In practice, however, there is also much "throwing and hoping", as well as a lot of fisherman's intuition.

Consequently, many methods have been developed to bring a more scientific approach to fishing, but these have principally been related to methods of detecting the presence of fish in a given location or the preferred habitat for the particular fish being sought. These methods have predominantly used acoustic echo sounders and other reflective "wave" techniques as the means for detecting fish and/or their habitat.

Whilst these acoustic sounders, or echo sounders as they are more commonly referred to, can detect the preferred habitat for bottom-dwelling fish life, such as Western Australian rock lobster, they are unable to actually detect such fish life on the sea or lake bottom. The reason for this is that these fish appear to be part of the sea or lake bed itself, at least in so far as the acoustic sounder is concerned.

Acoustic sounders, however, are able to detect the physical presence of middle and top-dwelling fish life. However this only occurs when the vessel containing the acoustic sounder is virtually right on top of the fish.

Thus, in general terms, acoustic sounders may at best be described as fish detectors, but certainly not fish predictors.

Sometimes top-dwelling fish can often be detected by other natural means, such as bird activity, or alternatively, visual observation of surface water activity. Mostly, however, for these types of fish, surface fishing gear has to be set up on an ad hoc basis to see if fish are present in that area.

Whilst these techniques are effective in showing the quantity in species of mid-dwelling fish in a particular area and the likely habitat for bottom-dwelling fish, they do not detect the water conditions or the environment in that area. In this respect, it is believed that water conditions are more important than habitat to a fish, and in fact fish will follow water conditions that are favourable to them. Further, it is believed that certain types or species of fish do not like sudden changes in depth, water temperature, salinity and certain other environmental aspects, but they prefer to acclimatise slowly.

Contrary to popular belief, it has been established that the water in the seas, oceans, rivers and lakes of the world are not one homogenous mixture, but rather are a collection of very different patches of water. Whilst the temperature obviously varies according to the whereabouts in the world that the body of water in question is located, it has also been discovered that the acidity, dissolved oxygen, salinity, turbidity and ORP (oxygen reduction potential) also varies significantly.

Significant variations can occur within quite close distances to one another. For example, there are known places in oceans and seas where there are fresh water springs where there is obviously low salinity proximate to and downstream or down-current of the spring and high levels of salinity at places similarly proximate to but upstream or up-current of the spring. Indeed, the change in salinity is a factor experienced proximate to a river mouth, where differences in salinity can vary considerably dependent upon the season and rainfall.

It is believed that fish, like most other living species prefer to live in the most comfortable habitat and environment that they can find. However, if that habitat and/or environment should commence to degrade, the fish will move, if possible, to a better one.

Whilst habitat can change, generally it does so over long time periods. On the other hand, environmental changes may occur very quickly. An example of this is in the ocean where certain types of seaweeds can break free and then quickly decompose. The products of decomposition can include ammonia, methane, iodine, protein and hydrogen sulphide. amongst others. These products can rapidly affect the immediate environment proximate to the decomposing seaweed.

Whereas some species of fish, such as Western Australian bream or snapper can be very tolerant of a wide range of ammonia, they find even minute levels of sulphuric acid (as produced by the hydrogen sulphide dissolving in water to form sulphurous acid, combining then with the dissolved oxygen to form sulphuric acid) to be very toxic.

On the other hand, crustaceans such as crabs and lobsters are very intolerant of small amounts of ammonia, but can live in a wide range of ORP.

Yet again, tuna is very sensitive to temperature and iodine, but is insensitive to ammonia.

When the fish find this change in the environment uncomfortable, they generally commence to move to a better one.

Similarly, a temperature of a sector of ocean can not only change significantly from one locality to another, but also from one depth to another. For instance, under certain specific conditions, it is possible to have warmer water underneath colder water.

The temperature of the water in which the fish are living is therefore an important parameter, so that in the case of fish living at, or near, the seabed, the temperature of the water at that depth is much more important than the surface water temperature. Conversely, for top-dwelling fish, the water surface temperature or the thermocline up to 6 metres deep is believed to be the more important parameter.

DISCLOSURE OF THE INVENTION

It is an object of the present invention to provide an apparatus and method to facilitate fishing utilising environmental factors in addition or alternatively to habitat factors.

In accordance with one aspect of the present invention, there is provided a system for fishing comprising:

input means for inputting acquired data comprising:
(a) geographical positioning data indicating the geographical position of a point in substantially real-time relative to a region:
(b) time data specifying the date, time or season corresponding to said real-time at said point; and
(c) water condition data in respect of the prevailing environment at said point;

database means for storing historical data relating to:
(a) the geographical locations of previous fishing or data acquisition activity,
(b) the date, time or season of said previous activity;
(c) the water conditions of the prevailing environment at said geographical locations during said previous activity; and
(d) fish data characterising the fish located at or obtained at the geographical locations of said previous activity;
and for storing the acquired data input by said input means relative to the geographical position of said point;
said database means including linking means for linking the acquired data to said historical data for the particular geographical position of said point;
interface means for accessing the acquired data and the historical data and outputting same in an appropriate medium for interpreting by a user of the system; and
processing means to process linked data and relate the same with historical data selected in accordance with predetermined parameters to
generate information for subsequent storage in said database means or outputting by said interface means;
wherein said predetermined parameters are those for providing an indication of the fish data from said historical data in the region of said point and the prevailing conditions corresponding to said fish data.

Preferably, said acquired data includes weather data indicating the prevailing weather conditions applying to the geographical position of said point in said region.

Preferably, said database means and said processing means form part of a database management system for storing and processing data in relation to the fishing operation to enable monitoring and controlling thereof, the processing including any one or combination of:
navigation and way point interpretation for fishing from a vessel so as to determine the geographical positioning of the vessel and the vessel related parameters such as speed and bearing;
depth;
water temperature;
water alkalinity;
moon phase;
swell;
data editing;
displaying the topographical features of the region;
layering and linking historical data on the image of topographical features;
subsequent analysing and further processing of data for data interrogation and predicting; or
processes particular to the type of fishing operation.

Preferably, said database means stores discrete records of fish data comprising fields corresponding to the particular fish type or species that is fished, the size or quantity of the fish, and other data that is acquired by said input means prevailing at the instant of inputting said fish data.

Preferably, said predetermined parameters include previously recorded minimum, maximum or optimum values of any one or combination of the historical data stored at a particular location or over a number of such locations that provides high fish data.

Preferably, said processing means includes various routines to access any or all of the historical data stored in the database means to determine any one or more of the following:
past fishing performance based on fish data linked to any other recorded data;
statistical averages according to any particular time grouping;
direction of change of swell (rising or falling);
rate of change of temperature;
distance travelled by vessel;
fuel used;
shortest distance to travel to fish.

Preferably, said processing means includes a predicting routine for running concurrently in real time with the acquistion of data, said predicting routine be able to cause said processing means to identify the optimum fishing conditions from said historical data for a particular region, load data representative of said optimum fishing conditions into a reference zone, compare instantaneously acquired data in respect of the fishing conditions at said point to the data loaded into said reference zone, and generate said information in respect thereof to determine whether said point is a good location to fish based on the comparison.

In accordance with another aspect of the present invention, there is provided a graphical user interface for a fishing system, comprising:
an image pane that displays topological features of a predetermined region for fishing;
layering means for layering indicia on said image pane indicating the relative locations of said predetermined region where fishing has been previously undertaken and logged by the fishing system;
linking means associated with each indicium to generate and display a table of data logged by the fishing system in relation to the fishing previously undertaken at said location; and
selecting means to select a said indicium and activate said linking means for the selected indicium to generate and display data logged for the location indicated by the selected indicium.

Preferably, said table is superimposed on the previous images displayed on said image pane.

Preferably, said fishing is lobster fishing and said indicia comprise different shapes representative of different time related factors associated with discrete pots that are set at different geographical locations at any one time as part of a lobster fishing operation.

In accordance with a further aspect of the present invention, there is provided a method for fishing comprising:
inputting acquired data comprising:
(a) geographical positioning data indicating the geographical position of a point in substantially real-time relative to a region:
(b) time data specifying the date, time or season corresponding to said real-time at said point; and (c) water condition data in respect of the prevailing environment at said point;

storing historical data relating to:
(a) the geographical locations of previous fishing or data acquisition activity;
(b) the date, time or season of said previous activity;
(c) the water conditions of the prevailing environment at said geographical locations during said previous activity; and
(d) fish data characterising the fish located at or obtained at the geographical locations of said previous activity;

storing the acquired data input relative to the geographical position of said point;

linking the acquired data to said historical data for the particular geographical position of said point;

accessing the acquired data and the historical data and outputting same in for interpreting by a user of the system; and processing linked data and relating the same with historical data selected in accordance with predetermined parameters to generate information for subsequent storage or outputting to the user;

wherein said predetermined parameters are those for providing an indication of the fish data from said historical data in the region of said point and the prevailing conditions corresponding to said fish data.

In accordance with a further aspect of the present invention, there is provided a method for fishing comprising:
displaying topological features of a predetermined region for fishing;
layering indicia on said topological features indicating the relative locations of said predetermined region where fishing has been previously undertaken and logged;
generating and displaying a table of data logged in relation to the fishing previously undertaken at said location; and
selecting a said indicium and generating displaying data logged for the location indicated by the selected indicium.

BRIEF DESCRIPTION OF THE DRAWINGS

The invention will be better understood in the light of the following description of one specific embodiment thereof. The description is made with reference to the accompanying drawings, wherein:

FIG. 8 is a typical print-out of a table listing historical data extracted from the database and processed by the fishing system to indicate the ideal fish conditions for a particular type or species of fish, wherein:

FIG. 8a is typical for Carpenteria Gulf tiger prawns;
FIG. 8b is typical for banana prawns;
FIG. 8c is typical for Western Australian rock lobster;
FIG. 8e is typical for Camarvon and Exmouth tiger prawns.

BEST MODE(S) FOR CARRYING OUT THE INVENTION

Figure 1:
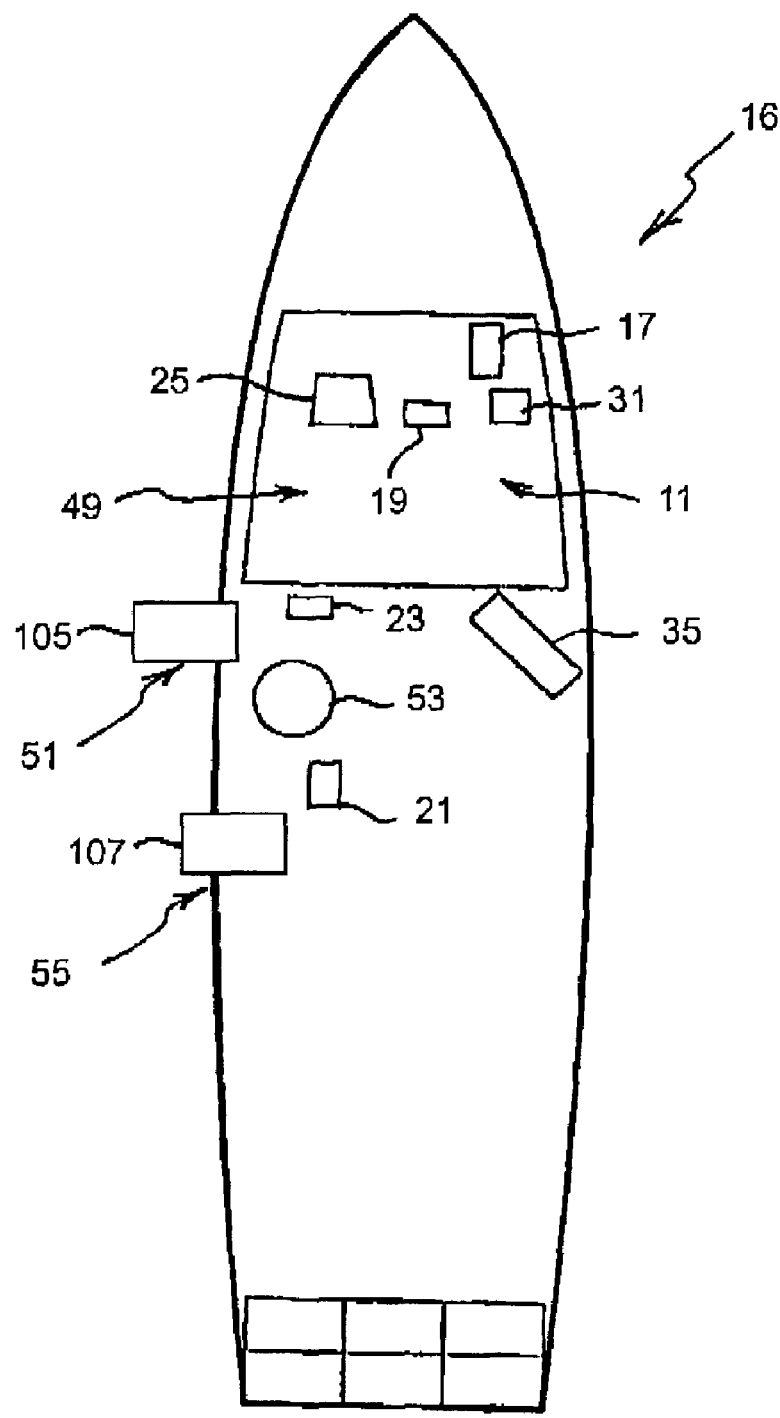
FIG. 1 is a schematic plan view showing the layout of lobster fishing vessel.
Figure 2:
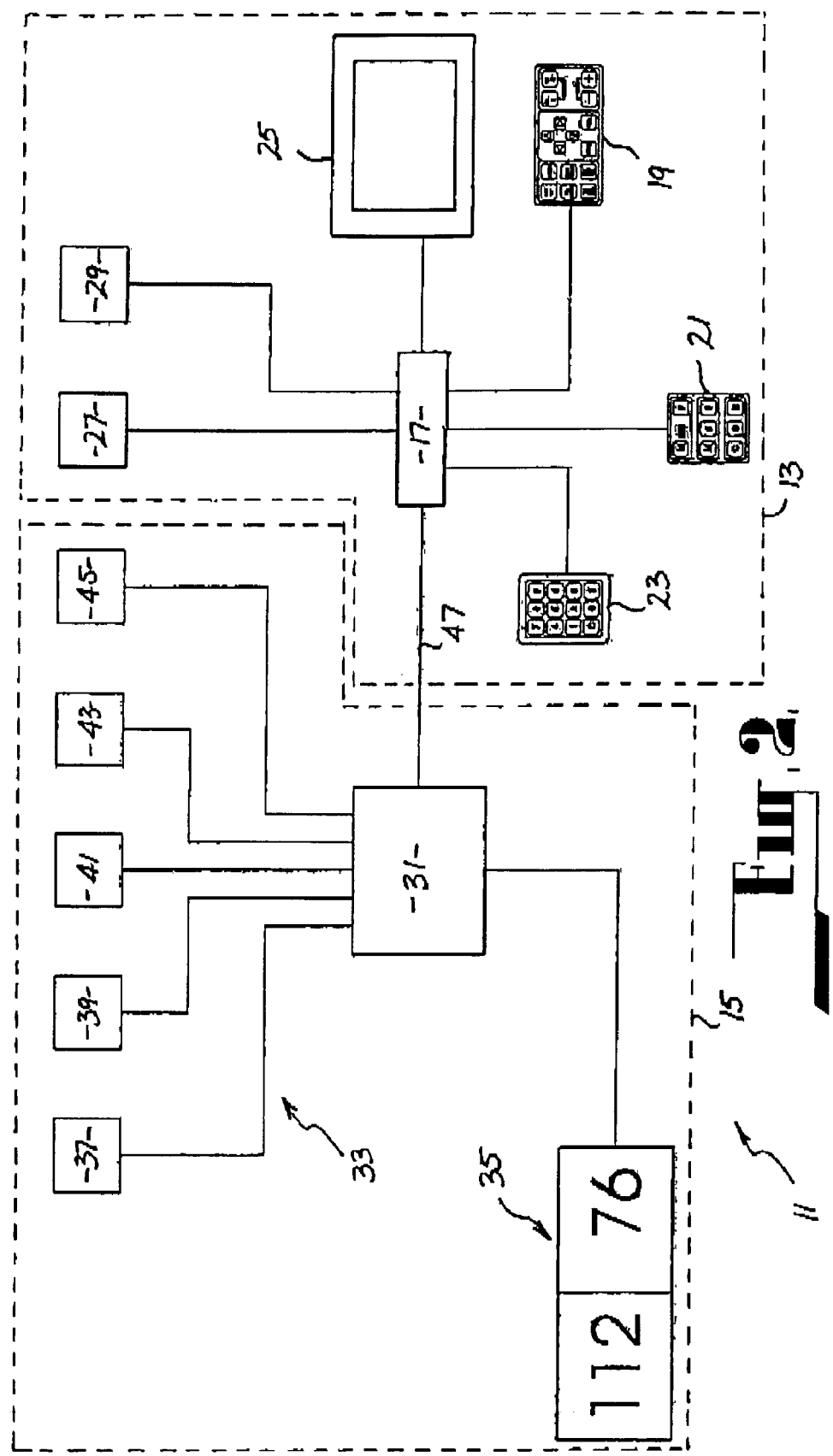
FIG. 2 is a schematic block diagram of the functional hardware layout of the fishing system.

As shown in FIGS. 1 and 2 of the drawings, the embodiment is directed towards a data acquisition and retrieval system 11 embodied in a personal computer (PC) system 13 and a controller interface system 15 which is installed on a lobster fishing vessel 16.

The functional layout of the data acquisition and retrieval system is shown in FIG. 2 of the drawings, whereby some of the functional components of the system are embodied in the PC system 13, and some in the controller interface system 15.

Having regard to FIG. 2 of the drawings, the specific components of the PC system 13 comprise the following:
PC computer 17 including a real-time clock (RTC) and conventional keypad;
wheelhouse hot panel 19;
deck counter panel 21;
deck number panel 23;
video display unit 25;
modem 27;
static input means 29 including a CD ROM and reader.

The various components of the interface system 15 comprise the following:
interface box 31 including interface processing means;
data input means 33 for inputting various dynamic and static data;
deck display 35.

The input means basically comprises suitable interfaces for accepting data input from various dynamic sensory sources and static sources on both the PC computer system 13 and the interface system 15. This data includes: geographical positioning data from a geographical positioning system (GPS) 37 indicating the geographical position of a point, being the fishing vessel 16 itself, in real-time relative to a geographical region; weather data indicating the prevailing weather conditions applying to the geographical position of the point in the region; and water condition data in respect of the prevailing water body environment at the point.

The geographical positioning data essentially comprises two components, the first being topological data indicating the topological features of a predetermined region for fishing and the second component being data indicating the position of the point with respect to this region.

The first component is essentially static reference data and can be obtained from digital maps showing the main topological detail of predetermined regions where fishing is to be undertaken. This data can be obtained from a separate device and input into the interface box 31 via one of the data input means 33, or alternatively may be provided in a software media form such as a CD ROM and loaded into the PC system 17 via the CD ROM reader 29.

The second component is generally dynamic data and can be derived from the GPS 37. The GPS 37 is generally a self contained and separate device that inputs data to the interface box 31 and across to the PC system 13 via the interface line 47.

The weather data comprises two components, one component being static data which may be directly input into the system via the modem 27, or alternatively input into the system via software media such as digital data stored on a CD ROM or floppy disc, in which case the data is loaded via the PC. The static data may comprise moon-phase detail and tidal information.

The second component is dynamic weather data which is obtained from discrete instrumentation located on the vessel and is fed in as digital data from a sensor or sensors 39 directly to the interface box 31. This dynamic weather data includes external weather conditions such as air temperature, barometric pressure, etc . . .

The water condition data essentially comprises all dynamic data pertaining to the particular locality of the fishing vessel or the point. The water condition data includes depth from a depth sensor 41, surface or depth water temperature from a temperature sensor 43, and other data generally represented at 45 such alkalinity or pH, dissolved oxygen content of the water, turbidity, swell and ORP.

The deck panel 21 is used for inputting additional dynamic data into the system including fish data characterising particular fish located at, or obtained at, the location of the vessel or point.

The wheelhouse hot panel 19 is used to simplify control and operation of the PC computer system 13 by the skipper of the vessel, which can alternatively be done via the main keypad of the PC computer 17. The hot panel, however, is more robust and simpler to operate than the main keypad, being more suited to the vigorous environment on a lobster fishing vessel.

Finally, the RTC is provided for inputting the real-time into the system so that any data captured or entered into the system at a particular point in time, is correlated to the real-time that this data capturing or inputting is undertaken.

The arrangement of the various components on the lobster fishing vessel is shown in FIG. 1. The PC computer 17, interface box 31, wheelhouse hot panel 19 and visual display unit 25 are all located in the wheelhouse 49.

The deck number panel 23 is located just behind the wheelhouse 49 at the pot pulling area 51 in front of the winch 53, the deck counter panel 21 is located at the pot counting area 55 just behind the winch 53 and the deck display 35 is also located just behind the wheelhouse 49, but on the opposite side to the pot pulling area 51 to enable it to be seen all deckhands.

Figure 4:
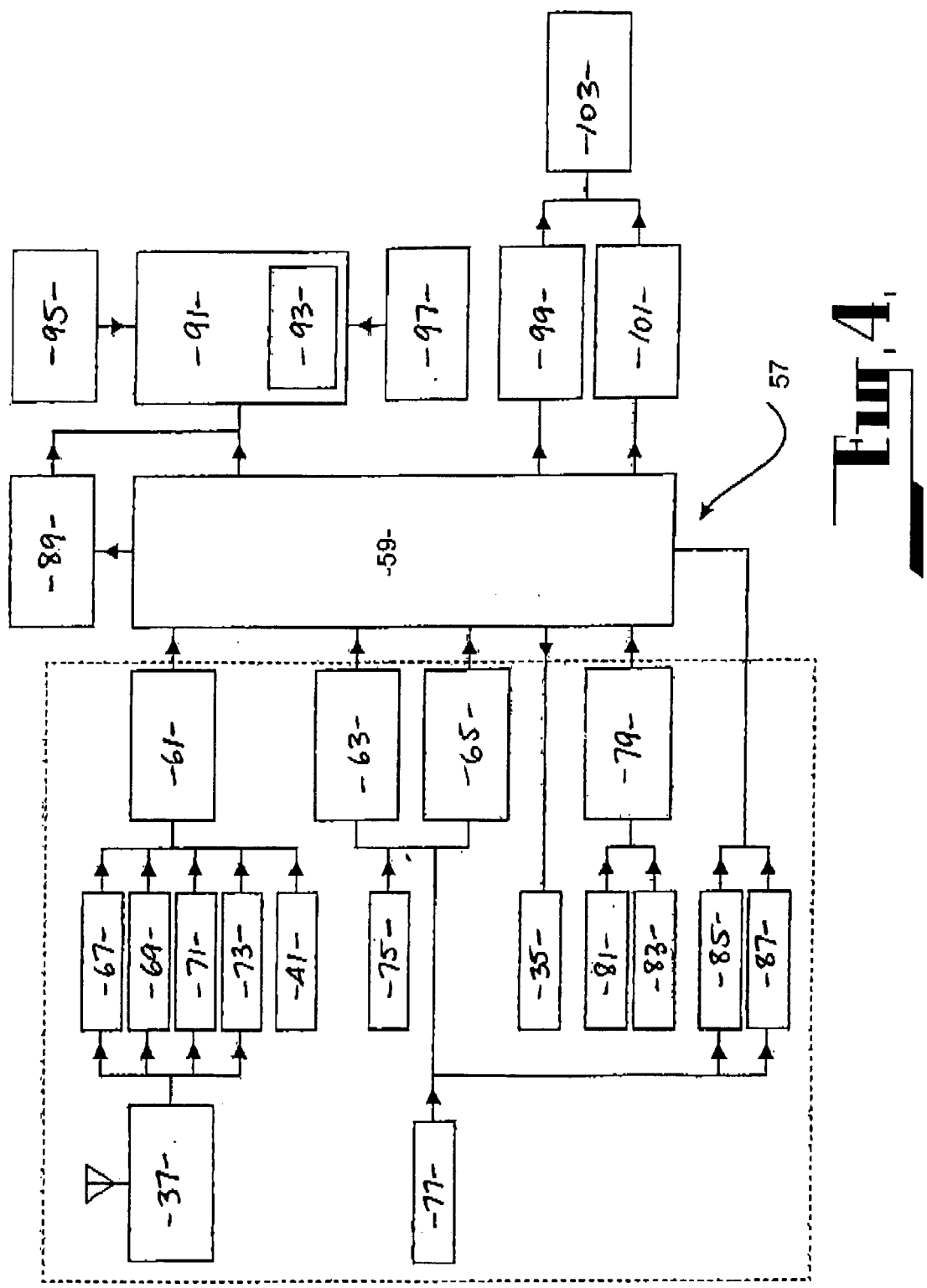
FIG. 4 is a functional block diagram showing the software processes of the system specially adapted for lobster fishing.
Figure 5:
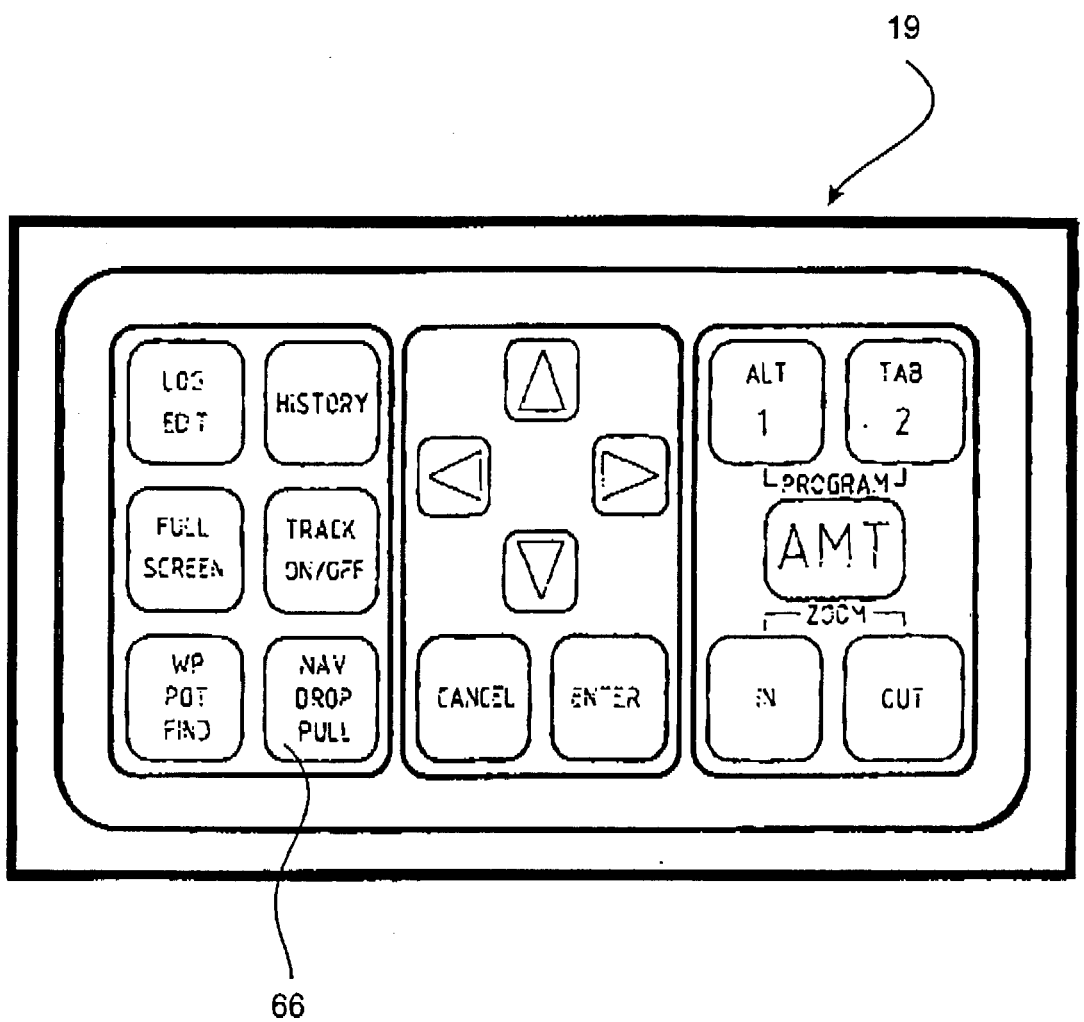
FIG. 5 is a plan view of the wheelhouse hot panel.
Figure 6:
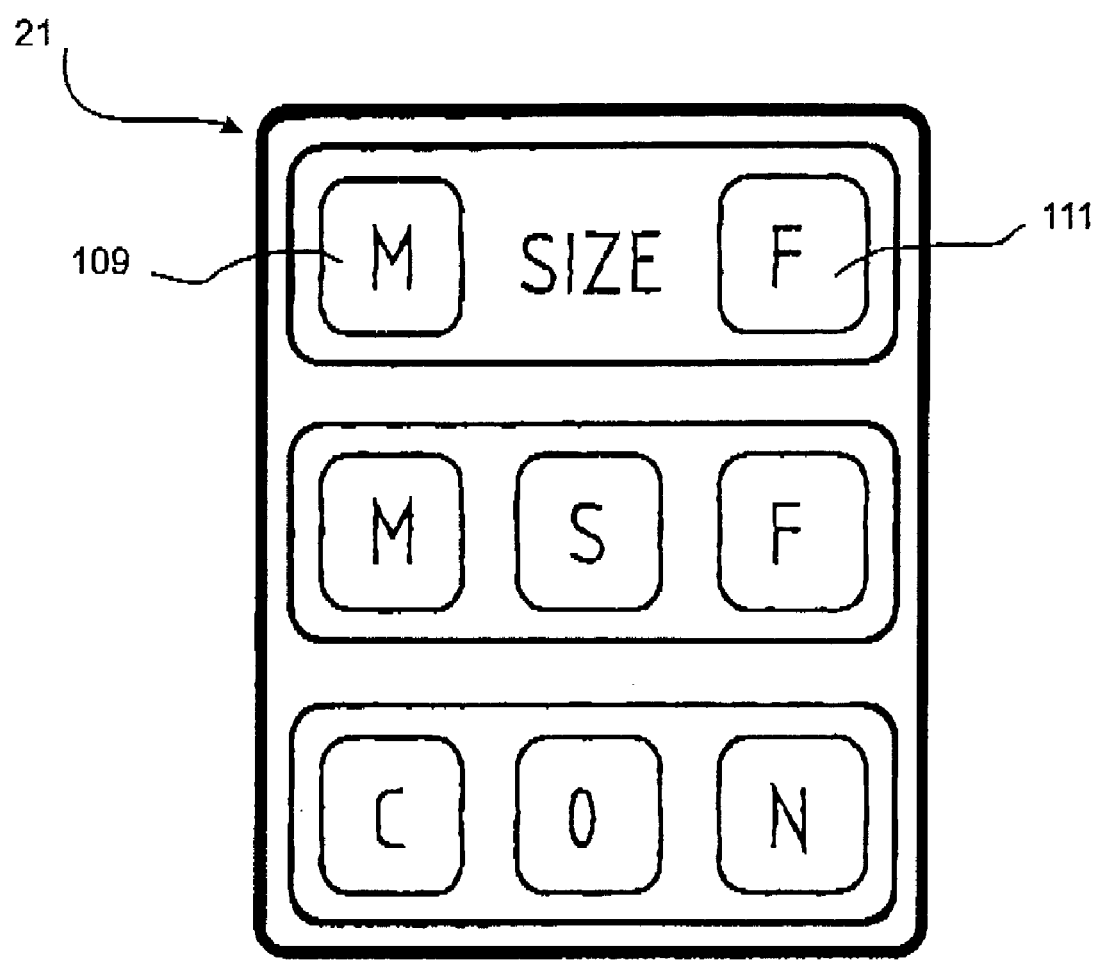
FIG. 6 is a plan view of the deck counter panel.
Figure 7:
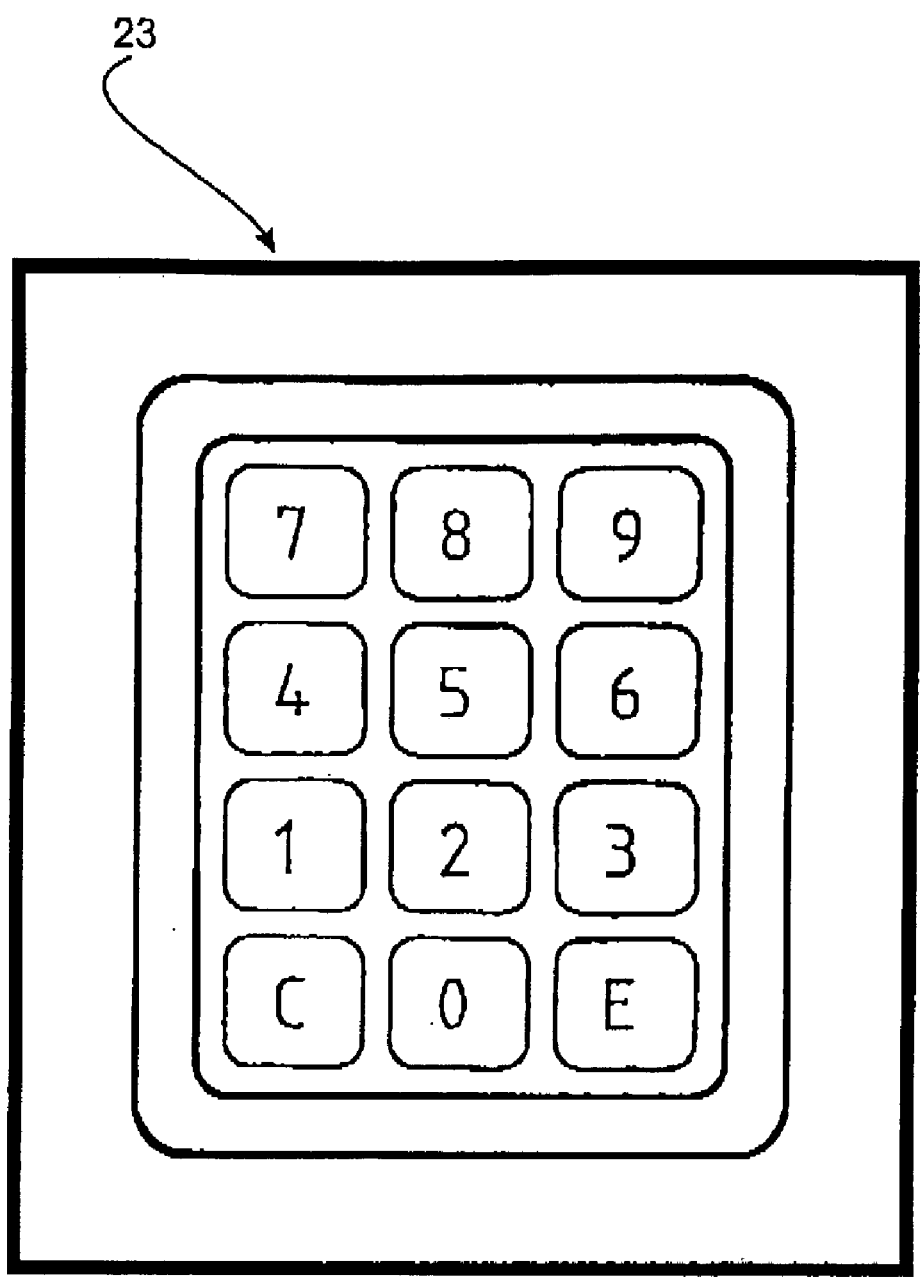
FIG. 7 is a plan view of the deck number panel.

The PC computer system 13 and the interface box 15 are operated by an operating system and application software the processes of which are shown in FIG. 4. These software processes not only manage the operation of the PC computer system 17 and controller interface system 31 with respect to the inputting of various data, but also operate a database management system (DBMS) 57 to store and process data in a database 59 and output relevant processed data from the database to enable monitoring and controlling of the fishing operation. This data can be retained for further analysis and the generation of a fishing history in the area.

As shown in FIG. 4, the processes include different modes such as navigation and way point interpretation 61 for the vessel 16, a drop pots mode 63 for storing pot location data, and a pull pots mode 65 for recording the catch data, all of which feed into the database 59.

The button 66 on the hot panel 19 selects between these different modes of operation.

The navigation and way point interpretation 61 is standard working off the GPS 37 and involving processes for determining latitude 67, longitude 69, boat speed 71 and bearing 73.

The depth is also input to the DBMS under this mode using the depth sounder sensor 41.

The drop pot mode 63 and the pull pot modes work off a deck panel process 75 and a wheelhouse keyboard/panel input process 77. The former controls the deck counter panel 21 and the deck number panel 23, and the latter controls the hot panel 19 and the main keypad for the PC computer 17.

A probe data process 79 for handling dynamic data concerning water and weather conditions 81 and 83 respectively, also inputs data into the database 59. Static data such as moon phase 85 and swell 87 is input directly into the database 59, with the aid of the wheelhouse keyboard/panel input process 77.

Figure 3:
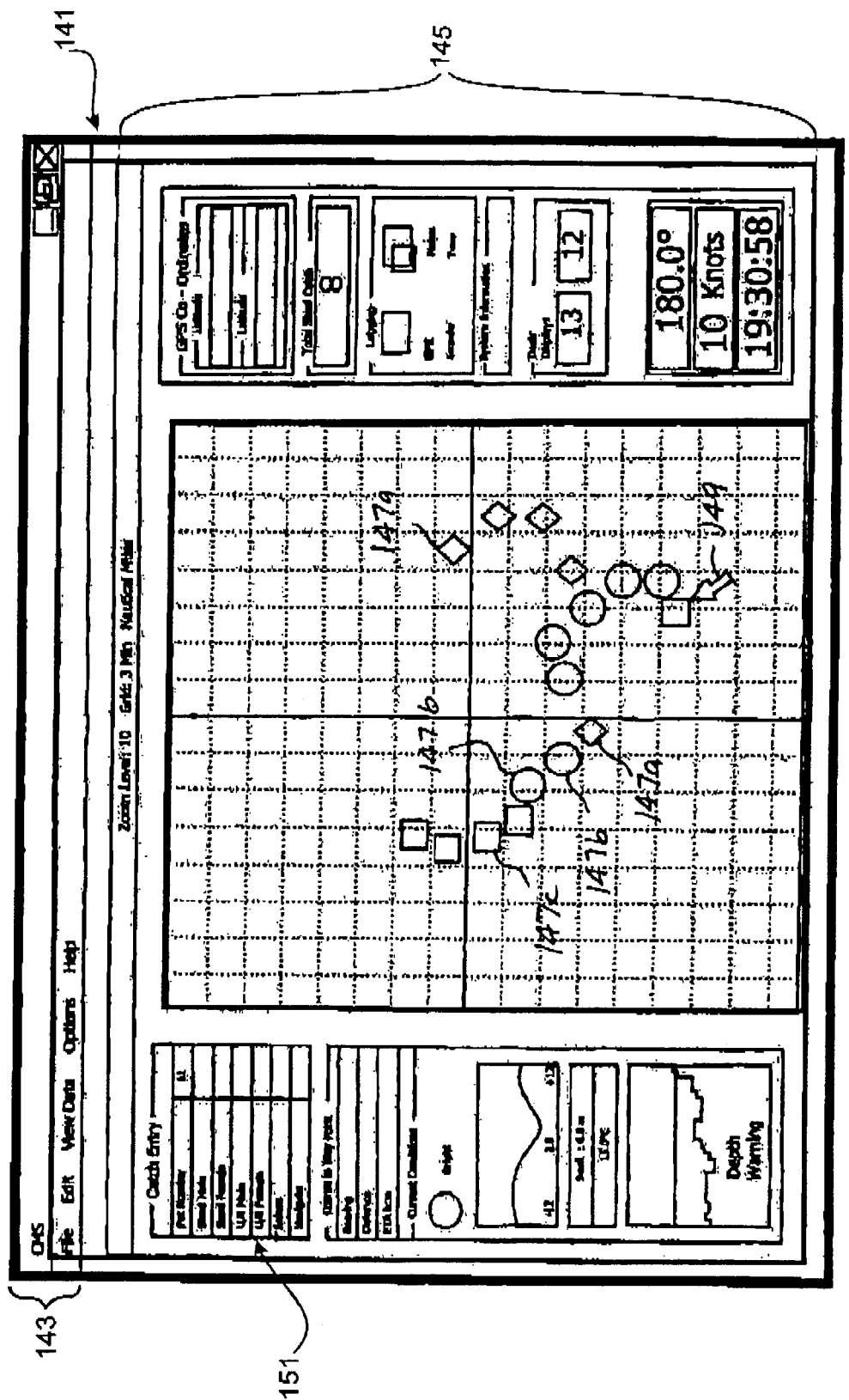
FIG. 3 is a typical screen display in a Windows™ graphical user interface that would be shown to an operator of the system.

The software processes also control the output of the database 59, in particular the main display provided via a graphical user interface (GUI) on the visual display unit 25. These processes include an edit data process 89 and the GUI 91 itself, which also displays a depth chart 93. The GUI 91 displays a map or image panel of the topological features of the area, an example of which is shown in FIG. 3 of the drawings. The GUI 91 is controlled by program options 95 and includes bit map overlay files 97 to help create a layered image.

The deck display 35 is also controlled from the DBMS 57.

For subsequent analysis and further processing of data, a data exchange process 99 and file output process 101 extract data from the database 59 and feed it into a data interrogation and prediction module 103.

The database 59 is arranged to store the aforementioned data input into the system in discrete records of a particular entity corresponding to the fish type or species, and where each of the records include fields corresponding to the aforementioned data which is input into the system. Each record of an entity would be referenced according to time and locality and the remaining data entered in the relevant fields manually and automatically, as appropriate.

In general, the system stores individual records of the following information:

What was caught (fish type, quantity);

Where it was caught (grid location provided by GPS);

When it was caught (date, time, season);

External conditions on which it was caught (moon phase, air temperature, barometric pressure, etc . . . ); and Water conditions (depth, various temperatures at intermediate depths, dissolved oxygen, ORP, turbidity, pH, swell, etc . . . ).

The keyboard and panels are used to enter data and operate the PC as appropriate. The GUI in the present embodiment is Windows™ and provides for interactive operation by an operator of the system.

The counter panel 21 is used to count the fish and enter data relating thereto. In the case of lobster, record is taken of whether lobster pulled in a pot shown at 105 and counted at 107 in FIG. 1, are male or female by pressing buttons 109 and 111 respectively, and buttons for other relevant data. The number panel is used for entering the number caught and the pot numbers, if necessary.

In practice in the data acquisition mode, the system operates so that the various data is continuously being input to the system from its various sources. Whenever fish are caught, the volume and/or weight of those fish is either manually or automatically entered by the fisherman on the boat using the keypad 19 or keyboard 27 into the system and the actual real-time dynamic data input to the input means 17 at that instant is also recorded and stored in the database, in conjunction with the time data obtained from the RTC.

The graphical user interface can be used to display historical information stored within the database for different locations within a predetermined region. The specific arrangement of the graphical user interface for this purpose is best described by reference to the particular display that will be provided to a user of the system, as shown in FIG. 3 of the drawings.

Moreover, the computer program is designed to display an image pane 141 on the display 25 which includes the typical Windows™ menu, control, tool and task bars 143 at a peripheral part of the pane and a graphical representation 145 in the remainder of the pane.

The graphical representation 145 displays the topological features of a selected predetermined region in which fishing is desired to be undertaken.

The computer program includes layering means to extract data from the database pertaining to specific locations within the displayed region at which data was previously captured and stored within the database, by the vessel. The layering means causes indicia to be layered on the image pane 141 in a manner so as to graphically indicate the relative locations in the predetermined region where this data logging had been undertaken. In the present embodiment as shown in the drawings, this is indicated by a diamond shape 147a, circle shape 147b and square shape 147c being superimposed on the topological features of the predetermined region.

These shapes represent different time related factors associated with pots that are set at any one time. The diamond shape represents a pot just released, a circle shape represents that the pot has been at that location for less than 36 hours, and the square shape represents that the pot has been at that location for more than 36 hours.

The computer program also includes linking means which is associated with each indicium or box 147 to generate and display a table of data logged by the fishing system at the location indicated by the indicium. This data is extracted from the database using a predetermined selection criteria which may be designed and modified via the menu and toolbar of the graphical user interface.

The computer program also includes selecting means in the form of a mouse pointer 149 to select an indicium 147 and activate the linking means for the selected indicium 147. On activation, the linking means generates and displays the logged data in accordance with the definition of the selection criteria from the database for the location represented by the selected indicium 147 and displays this data in a table 151 superimposed on the image pane, adjacent the mouse pointer 149.

The table 151 can be opened and closed in a toggle manner using mouse clicks.

The application software which effectively operates the PC also includes a number of routines for performing different types of processing on the data stored within the database. In this respect, data which is linked to previous data stored for the particular geographical position of the point can be processed and related in accordance with predetermined parameters and/or formulae to generate information for subsequent storage in the database and outputting on the display means or a suitable printer connected to the PC 13.

In the present embodiment, one of the parameters is concerned with identifying the minimum value in the recorded water condition data or weather data at a particular location (or over a number of such locations) providing high fish data. Another parameter is concerned with identifying the maximum values, or optimum values. This can be done on a species by species basis to determine what the optimum or ideal fish conditions are for that particular species.

Figure 8D:
FIG. 8d is typical for blue swimmer crabs.

FIG. 8 shows the type of data that may be output after processing by the processing means and which may be printed out on the printer for different fish types or species.

In addition, the processing means includes a routine to be able to view all historical records stored in the database to determine past fishing performance at any location, or time, or weather conditions, or sea temperature or other field in the records, or any combination of such fields in the records, such as:

catch to date for season for:
    exact location;
    general zones;
catch by month for:
    exact locations;
    general zones
catch by week for:
    exact locations
catch by day for:
    exact locations
    general zones
catch by year for:
    exact locations
    general zones.

Routines are also provided to calculate various statistical averages such as:

average catches;
per day fish, per month, per week, per location, per general zone.

Further still, routines are provided to perform useful calculations, such as:

direction of change of swell (rising or falling);
rate of change of various temperature;
boat distance travelled;
fuel used;
shortest distance to travel to fish.

The application software also includes a routine which is run in real-time, concurrently with acquisition of data, whereby optimum fishing conditions for different species are loaded into a reference zone and instantaneous data acquired from the various sources, compared against this reference.

Accordingly, the vessel can acquire real time data in relation to the water conditions over a predetermined geographical region by operating in a trolling mode to determine the best locality for fishing for a particular type or species of fish, having regard to the acquired data.

After surveying the predetermined region, the system is then invoked to identify the best locality to fish and the vessel is then returned to that locality to fish it.

The particular application software that can achieve the aforementioned functionality can be written a number of different ways and would be within the common general knowledge of a software programmer skilled in database management systems, databases, and interfacing with instrumentation using microcontrollers. Accordingly, the specific layout of the computer program will not be described.

It should be appreciated the scope of the particular is not limited to the specific embodiment described herein. Accordingly, many variations to the application software and functionality can be made in order to utilise the data stored in the database using the data acquisition and retrieval system without departing from the spirit or scope of the present invention.

The invention claimed is:

1. A system for fishing comprising:
   input means for inputting acquired data comprising:
   (a) geographical positioning data indicating the geographical position of a point in substantially real-time relative to a region:
   (b) time data specifying the date, time or season corresponding to said real-time at said point; and
   (c) water condition data in respect of the prevailing environment at said point;
   database means for storing historical data relating to:
   (a) the geographical locations of previous fishing or data acquisition activity;
   (b) the date, time or season of said previous activity;
   (c) the water conditions of the prevailing environment at said geographical locations during said previous activity; and
   (d) fish data characterising the fish located at or obtained at the geographical locations of said previous activity;
   and for storing the acquired data input by said input means relative to the geographical position of said point;
   said database means including linking means for linking the acquired data to said historical data for the particular geographical position of said point;
   interface means for accessing the acquired data and the historical data and outputting same in an appropriate medium for interpreting by a user of the system;
   processing means to process linked data and relate the same with historical data selected in accordance with predetermined parameters to generate information for subsequent storage in said database means or outputting by said interface means;
   wherein said predetermined parameters are those for providing an indication of the fish data from said historical data in the region of said point and the prevailing conditions corresponding to said fish data; and
   wherein said geographical positioning data includes a component of relatively static data in the form of topological data indicating the topological features of said region.

2. A system as claimed in claim 1, wherein said water condition data comprises relatively dynamic data in the form of any one of: water depth at said point, surface or depth water temperature, alkalinity, pH, dissolved oxygen content of the water, turbidity, swell or ORP; or any combination thereof.

3. A system as claimed in claim 1, wherein said acquired data includes weather data indicating the prevailing weather conditions applying to the geographical position of said point in said region.

4. A system as claimed in claim 3, wherein said weather data includes a component of relatively static data in the form of moon-phase detail and tidal information.

5. A system as claimed in claim 3, wherein said weather data includes a component of relatively dynamic data in the form of the actual external weather conditions applying to said point in real-time, such as any one of: air temperature, barometric pressure or wind speed; or any combination thereof.

6. A system as claimed in claim 1, wherein said fish data comprises any one of: the number of fish located or obtained, the type of fish, the size of the fish or the weight of the fish; or any combination thereof.

7. A system as claimed in claim 1, wherein said database means and said processing means form part of a database management system for storing and processing data in relation to the fishing operation to enable monitoring and controlling thereof, the processing including any one or combination of:
   navigation and way point interpretation for fishing from a vessel so as to determine the geographical positioning of the vessel and the vessel related parameters such as speed and bearing;
   depth;
   water temperature;
   water alkalinity;
   moon phase;
   swell;
   data editing;
   displaying the topographical features of the region;
   layering and linking historical data on the image of topographical features;
   subsequent analysing and further processing of data for data interrogation and predicting; or processes particular to the type of fishing operation.

8. A system as claimed in claim 7, wherein said fishing operation is lobster fishing and said vessel is a lobster fishing vessel having a pot dropping and pulling area; said input means including acquiring data in relation to the pots dropped and pulled; said interface means including a deck number panel for inputting data relating to the pots dropped and pulled and a deck display for displaying same; and the function performed by the interface means is selected between different modes including any combination of: navigation and way point interpretation, a drop pots mode for storing pot location data and a pull pots mode for recording fish data in relation to the pots pulled, said drop pots mode and said pull pots mode being additional processes performed by said database management means according to the particular type of fishing operation.

9. A system as claimed in claim 1, wherein said interface means includes a wheelhouse keypad and a visual display unit located in the wheelhouse of the vessel for accessing and displaying said data.

10. A system as claimed in claim 9, wherein said fishing operation is lobster fishing and said vessel is a lobster fishing vessel having a pot dropping and pulling area; said input means including acquiring data in relation to the pots dropped and pulled; said interface means including a deck number panel for inputting data relating to the pots dropped and pulled and a deck display for displaying same; and the function performed by the interface means is selected between different modes including any combination of: navigation and way point interpretation, a drop pots mode for storing pot location data and a pull pots mode for recording fish data in relation to the pots pulled, said drop pots mode and said pull pots mode being additional processes performed by said database management means according to the particular type of fishing operation, and said different modes are selected by means of said wheelhouse keypad.

11. A system as claimed in claim 1, wherein said fish data is input by means of a deck keypad located on the deck of the vessel.

12. A system as claimed in claim 1, wherein said database means stores discrete records of fish data comprising fields corresponding to the particular fish type or species that is fished, the size or quantity of the fish, and other data that is acquired by said input means prevailing at the instant of inputting said fish data.

13. A system as claimed in claim 12, wherein said other data for a said record comprises:
   location according to said geographical positioning data;
   time according to said time data;
   weather conditions according to said weather data; and
   water conditions according to said water condition data.

14. A system as claimed in claim 1, including a graphical user interface for displaying data stored in said database means using said interface means, said graphical user interface comprising:
   an image pane that displays the topological features of a predetermined region for fishing;
   layering means for layering indicia representative of historical data on said image pane indicating the relative locations of said predetermined region where fishing has been previously undertaken and logged by the fishing system;
   indicia linking means associated with each indicium to generate and display a table of historical data logged by the fishing system in relation to the fishing previously undertaken at said location; and
   selecting means to select a said indicium and activate said indicia linking means for the selected indicium to generate and display data logged for the location indicated by the selected indicium.

15. A system as claimed in claim 14, wherein said layering means is adapted for layering indicia in respect of selected acquired data on said image pane in real time, and said indicia linking means is adapted to generate and display a table in respect of selected acquired data that may or may not be the same as represented by said indicia.

16. A system as claimed in claim 14, wherein said table is superimposed on the previous images displayed on said image pane.

17. A system as claimed in claim 14, wherein said fishing is lobster fishing and said indicia comprise different shapes representative of different time related factors associated with discrete pots that are set at different geographical locations at any one time as part of a lobster fishing operation.

18. A system as claimed in claim 17, wherein one shape represents a pot that has just been released, another shape represents a pot that has been at its set location for a prescribed period of time, and a further shape represents a pot that has been at its set location for a period in excess of the said prescribed period of time.

19. A system as claimed in claim 14, wherein the table of logged data displayed by said linking means is generated in accordance with a predetermined selection criteria that may be designed and modified by means of said interface means.

20. A system as claimed in claim 19, wherein said linking means is activated by a pointer selecting a said indicium and inputting a control signal via said interface means.

21. A system as claimed in claim 1, wherein said predetermined parameters include previously recorded minimum, maximum or optimum values of any one or combination of the historical data stored at a particular location or over a number of such locations that provides high fish data.

22. A system as claimed claim 1, wherein said processing means includes various routines to access any or all of the historical data stored in the database means to determine any one or more of the following:
   past fishing performance based on fish data linked to any other recorded data;
   statistical averages according to any particular time grouping;
   direction of change of swell (rising or falling);
   rate of change of temperature;
   distance travelled by vessel;
   fuel used;
   shortest distance to travel to fish.

23. A system as claimed in claim 1, wherein said processing means includes a predicting routine for running concurrently in real time with the acquistion of data, said predicting routine be able to cause said processing means to identify the optimum fishing conditions from said historical data for a particular region, load data representative of said optimum fishing conditions into a reference zone, compare instantaneously acquired data in respect of the fishing conditions at said point to the data loaded into said reference zone, and generate said information in respect thereof to determine whether said point is a good location to fish based on the comparison.

24. A graphical user interface for a fishing system, comprising:
   an image pane that displays topological features of a predetermined region for fishing;
   layering means for layering indicia on said image pane indicating the relative locations of said predetermined region where fishing has been previously undertaken and logged by the fishing system;
   indicia linking means associated with each indicium to generate and display a table of data logged by the fishing system in relation to the fishing previously undertaken at said location; and
   selecting means to select a said indicium and activate said indicia linking means for the selected indicium to generate and display data logged for the location indicated by the selected indicium.

25. A graphical interface as claimed in claim 24, wherein said table is superimposed on the previous images displayed on said image pane.

26. A system as claimed in claim 24, wherein said fishing is lobster fishing and said indicia comprise different shapes representative of different time related factors associated with discrete pots that are set at different geographical locations at any one time as part of a lobster fishing operation.

27. A system as claimed in claim 26, wherein one shape represents a pot that has just been released, another shape represents a pot that has been at its set location for a prescribed period of time, and a further shape represents a pot that has been at its set location for a period in excess of the said prescribed period of time.

28. A system as claimed in claim 24, wherein the table of logged data displayed by said linking means is generated in accordance with a predetermined selection criteria that may be designed and modified by an interface means.

29. A system as claimed in claim 28, wherein said linking means is activated by a pointer selecting a said indicium and inputting a control signal via said interface means.

30. A method for fishing comprising:
   inputting acquired data comprising:
   (a) geographical positioning data indicating the geographical position of a point in substantially real-time relative to a region:
   (b) time data specifying the date, time or season corresponding to said real-time
   at said point; and
   (c) water condition data in respect of the prevailing environment at said point;
   storing historical data relating to:
   (a) the geographical locations of previous fishing or data acquisition activity;

(b) the date, time or season of said previous activity;
(c) the water conditions of the prevailing environment at said geographical locations during said previous activity; and
(d) fish data characterising the fish located at or obtained at the geographical locations of said previous activity;
storing the acquired data input relative to the geographical position of said point;
linking the acquired data to said historical data for the particular geographical position of said point;
accessing the acquired data and the historical data and outputting same in for interpreting by a user of the system; and
processing linked data and relating the same with historical data selected in accordance with predetermined parameters to generate information for subsequent storage or outputting to the user;
wherein said predetermined parameters are those for providing an indication of the fish data from said historical data in the region of said point and the prevailing conditions corresponding to said fish data.

31. A method as claimed in claim 30, wherein said geographical positioning data includes a component of relatively static data in the form of topological data indicating the topological features of said region.

32. A method as claimed in claim 30, wherein said water condition data comprises relatively dynamic data in the form of any one of: water depth at said point, surface or depth water temperature, alkalinity, pH, dissolved oxygen content of the water, turbidity, swell or ORP; or any combination thereof.

33. A method as claimed in claim 30, including inputting weather data indicating the prevailing weather conditions applying to the geographical position of said point in said region as part of the acquired data.

34. A method as claimed in claim 33, wherein said weather data includes a component of relatively static data in the form of moon-phase detail and tidal information.

35. A method as claimed in claim 33, wherein said weather data includes a component of relatively dynamic data in the form of the actual external weather conditions applying to said point in real-time, such as any one of: air temperature, barometric pressure or wind speed; or any combination thereof.

36. A method as claimed in claim 30, wherein said fish data comprises any one of: the number of fish located or obtained, the type of fish, the size of the fish or the weight of the fish; or any combination thereof.

37. A method as claimed in claim 30, including storing and processing data in relation to the fishing operation to enable monitoring and controlling thereof, the processing including any one or combination of:
navigation and way point interpretation for fishing from a vessel so as to determine the geographical positioning of the vessel and the vessel related parameters such as speed and bearing;
depth;
water temperature;
water alkalinity;
moon phase;
swell;
data editing;
displaying the topographical features of the region;
layering and linking historical data on the image of topographical features;
subsequent analysing and further processing of data for data interrogation and predicting; or
processes particular to the type of fishing operation.

38. A method as claimed in claim 37, wherein said fishing operation is lobster fishing and said vessel is a lobster fishing vessel having a pot dropping and pulling area; the method including inputting data relating to the pots dropped and pulled and displaying same; and selecting between inputting and outputting information relating to any combination of: navigation and way point interpretation, storing pot location data in relation to the dropping of pots, and recording fish data in relation to the pulling of pots.

39. A method as claimed in claim 30, including storing the acquired data in discrete records of fish data, comprising fields corresponding to the particular fish type or species that is fished, the size or quantity of the fish, and other data that is acquired at the instant of inputting said fish data.

40. A method as claimed in claim 39, wherein said other data for a said record comprises:
location according to said geographical positioning data;
time according to said time data;
weather conditions according to said weather data; and
water conditions according to said water condition data.

41. A method as claimed in claim 30, including graphically displaying stored data comprising the topological features of a predetermined region for fishing; layering indicia representative of historical data on the topographical features indicating the relative locations of said predetermined region where fishing has been previously undertaken and logged by the fishing system; generating and displaying a table of historical data logged by the fishing system in relation to the fishing previously undertaken at said location; and selecting a said indicium and generating and displaying data logged for the location indicated by the selected indicium.

42. A method as claimed in claim 41, including layering indicia in respect of selected acquired data on said topographical features in real time, and generating and displaying a table in respect of selected acquired data that may or may not be the same as represented by said indicia.

43. A method as claimed in claim 41, wherein said table is superimposed on the previous images displayed.

44. A method as claimed in claim 41, wherein the said fishing is lobster fishing and said indicia comprise different shapes representative of different time related factors associated with discrete pots that are set at different geographical locations at any one time as part of a lobster fishing operation.

45. A method as claimed in claim 44, wherein one shape represents a pot that has just been released, another shape represents a pot that has been at its set location for a prescribed period of time, and a further shape represents a pot that has been at its set location for a period in excess of the said prescribed period of time.

46. A method as claimed in claim 41, wherein the table of logged data displayed is generated in accordance with a predetermined selection criteria that may be designed and modified.

47. A method as claimed in claim 46, wherein said linking is activated by pointing to a selected indicium and inputting a control signal.

48. A method as claimed in claim 30, wherein said predetermined parameters include previously recorded minimum, maximum or optimum values of any one or combination of the historical data stored at a particular location or over a number of such locations that provides high fish data.

49. A method as claimed in claim 30, including accessing any or all of the historical data stored in the database means to determine any one or more of the following:

past fishing performance based on fish data linked to any other recorded data;
  statistical averages according to any particular time grouping;
  direction of change of swell (rising or falling);
  rate of change of temperature;
  distance travelled by vessel;
  fuel used;
  shortest distance to travel to fish.

50. A method as claimed in claim 30, including identifying the optimum fishing conditions from said historical data for a particular region, loading data representative of said optimum fishing conditions into a reference zone, comparing instantaneously acquired data in respect of the fishing conditions at said point to the data loaded into said reference zone, and generating said information in respect thereof to determine whether said point is a good location to fish based on the comparison.

51. A method for fishing comprising:

displaying topological features of a predetermined region for fishing;
  layering indicia on said topological features indicating the relative locations of said predetermined region where fishing has been previously undertaken and logged;
  generating and displaying a table of data logged in relation to the fishing previously undertaken at said location; and
  selecting a said indicium and generating displaying data logged for the location indicated by the selected indicium.

52. A method as claimed in claim 51, wherein said table is superimposed on the previous images displayed.

53. A method as claimed in claim 51, wherein the said fishing is lobster fishing and said indicia comprise different shapes representative of different time related factors associated with discrete pots that are set at different geographical locations at any one time as part of a lobster fishing operation.

54. A method as claimed in claim 53, wherein one shape represents a pot that has just been released, another shape represents a pot that has been at its set location for a prescribed period of time, and a further shape represents a pot that has been at its set location for a period in excess of the said prescribed period of time.

55. A method as claimed in claim 51, wherein the table of logged data displayed is generated in accordance with a predetermined selection criteria that may be designed and modified.

56. A method as claimed in claim 55, wherein said linking is activated by pointing to a selected indicium and inputting a control signal.

* * * * *

UNITED STATES PATENT AND TRADEMARK OFFICE
CERTIFICATE OF CORRECTION

PATENT NO. : 7,254,483 B2
APPLICATION NO. : 10/149343
DATED : August 7, 2007
INVENTOR(S) : Squires et al.

It is certified that error appears in the above-identified patent and that said Letters Patent is hereby corrected as shown below:

Column 17, line 15, the word "ftom" should be replaced with --from--.

Signed and Sealed this

First Day of April, 2008

JON W. DUDAS
*Director of the United States Patent and Trademark Office*